(12) United States Patent
Gamble et al.

(10) Patent No.: US 9,422,728 B2
(45) Date of Patent: Aug. 23, 2016

(54) DECK BOARD FASTENER AND ARRANGEMENT

(71) Applicant: Precision Made Products, Brunswick, OH (US)

(72) Inventors: Chad Ryan Gamble, Elyria, OH (US); Mike John Roth, Grafton, OH (US); Majid Daneshvar, Akron, OH (US); Hossein Lavvafi, Fort Wayne, IN (US)

(73) Assignee: Precision Made Products, Brunswick, OH (US)

( * ) Notice: Subject to any disclaimer, the term of this patent is extended or adjusted under 35 U.S.C. 154(b) by 0 days.

(21) Appl. No.: 14/307,158

(22) Filed: Jun. 17, 2014

(65) Prior Publication Data

US 2014/0366334 A1    Dec. 18, 2014

Related U.S. Application Data

(60) Provisional application No. 61/836,337, filed on Jun. 18, 2013.

(51) Int. Cl.
| | | |
|---|---|---|
| *E04F 15/02* | (2006.01) | |
| *F16B 5/02* | (2006.01) | |
| *E04F 13/08* | (2006.01) | |

(Continued)

(52) U.S. Cl.
CPC .......... *E04F 15/02044* (2013.01); *E04B 9/28* (2013.01); *E04F 13/0846* (2013.01); *F16B 2/14* (2013.01); *F16B 5/02* (2013.01); *E04B 2001/2628* (2013.01); *E04F 2015/02088* (2013.01); *E04F 2015/02094* (2013.01); *E04F 2015/02116* (2013.01); *E04F 2201/05* (2013.01); *E04F 2201/0505* (2013.01); *Y10T 24/34* (2015.01)

(58) Field of Classification Search
CPC ............... E04F 2201/05; E04F 2015/02088; E04F 2015/02094
See application file for complete search history.

(56) References Cited

U.S. PATENT DOCUMENTS 1,714,738 A * 5/1929 Smith ........................... 52/512
4,716,704 A * 1/1988 Murr ..................... E04F 19/065
                                                        52/471

(Continued)

FOREIGN PATENT DOCUMENTS

AT          506244 A2 *  7/2009
CA         2482296 A1 *  3/2005

(Continued)

OTHER PUBLICATIONS

International Search Report and Written Opinion; Corresponding PCT Application No. PCT/US2014042773; Authorized Officer Commissioner; Oct. 29, 2014.

*Primary Examiner* — Joshua J Michener
*Assistant Examiner* — Chiedu Chibogu
(74) *Attorney, Agent, or Firm* — Squire Patton Boggs (US) LLP

(57) ABSTRACT

A fastening device includes a receptor portion having an angled through hole extending from a first surface of the receptor portion to a second surface of the receptor portion, wherein the angled through hole has an angled axis. The fastening device further includes a top portion having at least a first flange and a second flange extending generally outwardly from the receptor portion. The flanges generally define a flange plane. The angled axis intersects the flange plane at an intersecting angle between 0 and 90 degrees.

6 Claims, 5 Drawing Sheets

(51) Int. Cl.
*E04B 9/28* (2006.01)
*F16B 2/14* (2006.01)
*E04B 1/26* (2006.01)

(56) References Cited

U.S. PATENT DOCUMENTS

| | | | | |
|---|---|---|---|---|
| 4,925,141 | A * | 5/1990 | Classen | E04B 5/12 248/217.2 |
| 5,160,211 | A * | 11/1992 | Gilb | E04F 11/181 256/65.02 |
| 5,497,593 | A * | 3/1996 | Riesberg | 52/702 |
| 5,953,878 | A * | 9/1999 | Johnson | 52/582.2 |
| 5,997,209 | A * | 12/1999 | Sachs | E04B 5/12 403/384 |
| 6,134,854 | A * | 10/2000 | Stanchfield | 52/480 |
| D450,568 | S * | 11/2001 | Sachs | D8/382 |
| 6,402,415 | B1 * | 6/2002 | Eberle, III | 403/231 |
| 6,449,918 | B1 * | 9/2002 | Nelson | E04F 15/04 52/570 |
| 6,484,467 | B2 * | 11/2002 | Crout | 52/483.1 |
| 6,651,398 | B2 * | 11/2003 | Gregori | 52/489.1 |
| 6,810,633 | B2 * | 11/2004 | Harris, Sr. | 52/489.2 |
| 7,052,200 | B2 * | 5/2006 | Harris | 403/231 |
| D573,454 | S * | 7/2008 | Eberle, III | D8/382 |
| 7,793,470 | B1 | 9/2010 | Mathiesen et al. | |
| 7,874,113 | B2 * | 1/2011 | Eberle, III | 52/403.1 |
| 8,066,464 | B1 * | 11/2011 | Van Dyke | 411/458 |
| D664,836 | S * | 8/2012 | Kikuchi | D8/382 |
| 8,393,125 | B2 | 3/2013 | Martel | |
| 2002/0121064 | A1 * | 9/2002 | Erwin | E01C 5/22 52/586.1 |
| 2003/0154662 | A1 * | 8/2003 | Bruchu | E04F 15/10 52/87 |
| 2004/0020152 | A1 * | 2/2004 | Harris, Sr. | 52/582.1 |
| 2004/0144056 | A1 * | 7/2004 | Morton et al. | 52/650.3 |
| 2004/0184878 | A1 * | 9/2004 | Eberle, III | 403/408.1 |
| 2006/0059822 | A1 * | 3/2006 | Guffey | E04F 15/02 52/480 |
| 2006/0242916 | A1 * | 11/2006 | Simko et al. | 52/177 |
| 2006/0283122 | A1 * | 12/2006 | Burgess et al. | 52/480 |
| 2009/0019805 | A1 * | 1/2009 | Zanelli | 52/489.1 |
| 2009/0217495 | A1 * | 9/2009 | Tipps et al. | 24/458 |
| 2013/0104493 | A1 * | 5/2013 | Orchard | 52/704 |

FOREIGN PATENT DOCUMENTS

| | | | | |
|---|---|---|---|---|
| CA | 2506137 A1 * | 11/2006 | | |
| DE | 3903693 A1 * | 8/1990 | | E04F 13/0821 |
| DE | 102008008074 A1 * | 7/2009 | | E04F 15/04 |
| EP | 1600579 A1 * | 11/2005 | | |
| EP | 2078804 A2 * | 7/2009 | | E04F 15/04 |
| FR | 2858342 A1 * | 2/2005 | | E04B 5/12 |
| JP | 2006-063747 | 3/2006 | | |
| JP | 2007-002463 | 1/2007 | | |
| KR | 10-0974947 | 8/2010 | | |
| WO | WO 2010071930 A1 * | 7/2010 | | |
| WO | WO 2012056074 A1 * | 5/2012 | | |

* cited by examiner

DECK BOARD FASTENER AND ARRANGEMENT

CROSS REFERENCE TO RELATED APPLICATIONS

This application is a non-provisional application that claims priority to U.S. Provisional Application No. 61/836,337 filed on Jun. 18, 2013, the disclosure of which is incorporated herein by reference in its entirety.

FIELD OF INVENTION

The present disclosure relates to a fastening device. More particularly, the present disclosure relates to a fastening device having an angled through hole.

BACKGROUND

In general, a deck commonly consists of horizontal floors raised above the ground and supported by an underlying structure. Typically, decks can be connected to adjacent residential, commercial, or industrial buildings, where deck boards are positioned adjacent to each other or side-by-side during construction of a deck. These positionings are typically arranged to cross structures associated therewith, such as joints at an angle perpendicular to the longitudinal axis of the joist. Other structures that employ similar flooring operations can further be associated with marine structures, wheel chair access structures such as ramps, inclined surfaces, platforms, structures associated with enclosing recreational areas such as swimming pools and hot tubs.

In general, decks can be constructed to tolerate harsh weather conditions and exposure to various atmospheric elements. Moreover, such deck structures can be fabricated from material such as: pressure treated wood, plastics, composite, synthetic substances and the like. Structure of decks typically includes joist and headers attached to posts. The deck boards are typically transversely fixed across joists associated therewith. The resulting substructure represents a generally parallel relationship of deck boards that are fastened via various fastening mechanism such as nails or screws, which can be driven through an upper surface of deck boards into underlying joist.

Various fastening mechanisms such as nails or screws are typically employed to attach various deck boards and joists together. In this regard, when remedial operations to a deck are required (e.g., replacing a cracked deck board, a deck technician typically requires easy access to the fastening mechanisms that connect various deck boards and joists. Nonetheless, easy access to the fastening mechanism is hindered, when the deck technician as to displace adjacent boards, or first remove other parts of such deck.

SUMMARY

In one embodiment, a fastening device includes a receptor portion having an angled through hole extending from a first surface of the receptor portion to a second surface of the receptor portion. The angled through hole defines a first opening and a second opening in the first surface and second surface, respectively. The angled through hole has an angled axis. The fastening device further includes a top portion having at least two flanges, including a first flange and a second flange, extending generally outwardly from the receptor portion. The flanges generally define a flange plane; wherein the first opening in the first surface of the receptor portion is distal from the first flange, second flange and top portion. The top portion extends above the receptor portion and has a convex upper surface. The angled axis intersects the flange plane at an intersecting angle between 19 and 71 degrees.

In another embodiment, a fastening device includes a receptor portion having an angled through hole extending from a first surface of the receptor portion to a second surface of the receptor portion, wherein the angled through hole has an angled axis. The fastening device further includes a top portion having at least a first flange and a second flange extending generally outwardly from the receptor portion. The flanges generally define a flange plane. The angled axis intersects the flange plane at an intersecting angle between 0 and 90 degrees.

In yet another embodiment, a fastening device includes a receptor portion having an angled through hole extending from a front surface of the receptor portion to a back surface of the receptor portion, wherein the angled through hole has an angled axis. The fastening device also includes a top portion having at least two flanges extending generally outwardly from the top portion. The flanges define a generally horizontal flange plane, and are generally perpendicular to the receptor portion. The angled axis intersects the flange plane at an intersecting angle between 0 and 90 degrees. Additionally, the top portion may have a convex surface.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

Figure 1:
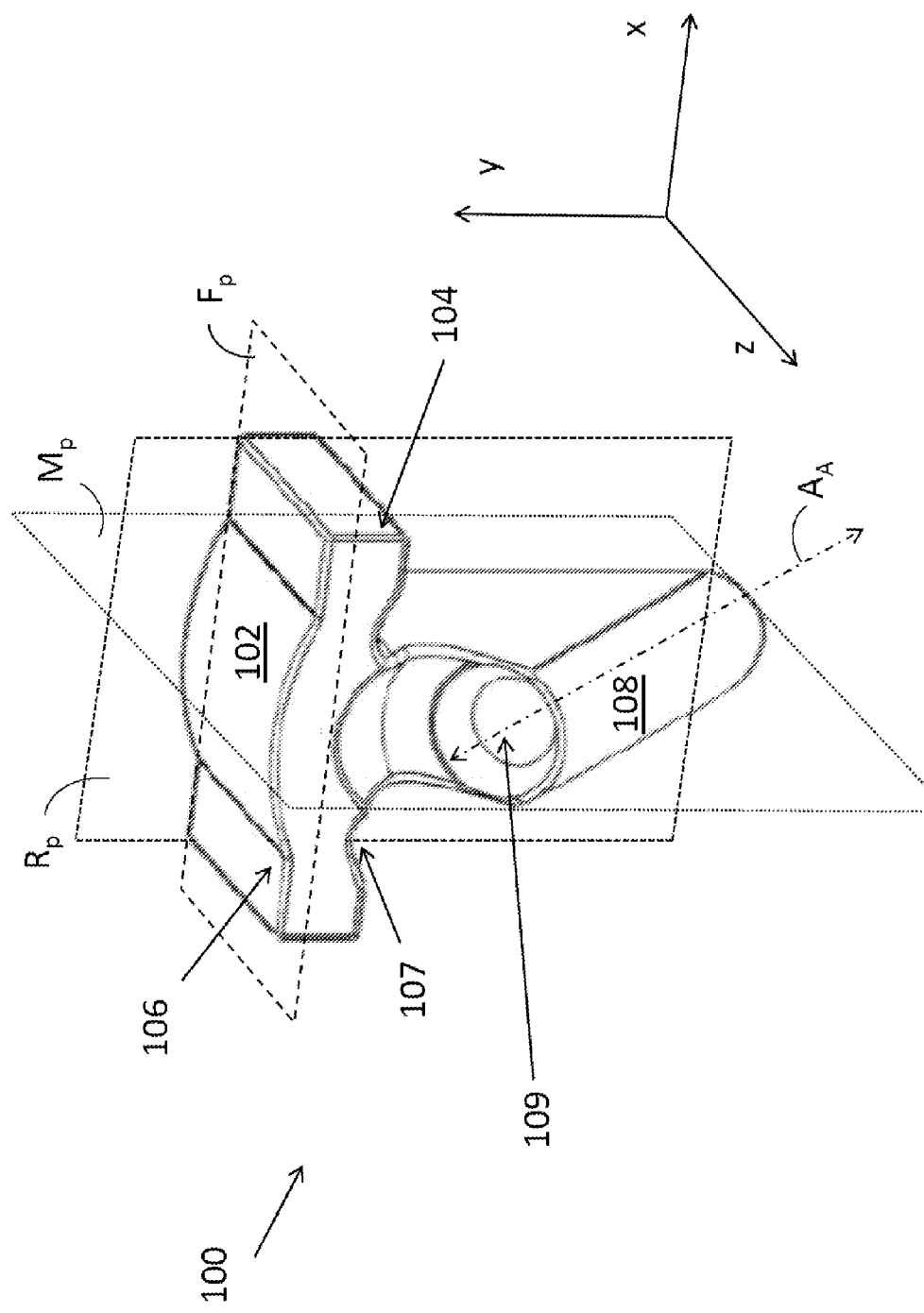
FIG. 1 depicts an isometric view of a first embodiment of deck fastening device. A coordinate system is shown to be used as an aid in defining the relative relationships of the various components of deck fastening device. Any coordinate system could be used, and the directions are not intended to limit the scope of the deck fastening device in any way.

The various features of the deck fastening device will be described with reference to directions and planes as defined here. The orientation of the deck fastening device shown in FIG. 1 is defined by the x, y, and z axes. The x, y, and z axes can correspond to any of the orthogonal directions in practice, but here the x axis will refer to a "side-side" axis, the y axis will refer to a "top-bottom" axis, and the z axis will refer to a "front-back" axis. The orientation shown in FIG. 1 is used purely as an example to aid in defining the relative relationships between the deck fastening device's components. Thus, the terms "top", "upper", "above", "upwardly", or "bottom", "lower", "below", "downwardly" will refer to relative locations along the y axis shown in FIG. 1. The terms "front", "in front of" or "back", "behind" will refer to relative locations along the z axis shown in FIG. 1. The term "side" will refer to relative locations along the x axis shown in FIG. 1. With respect to all three axes, the terms "inner", "inwardly", or "outer", "outwardly" will refer to relative locations closer or farther from the origin.

In light of the directions defined above, the "meridian plane" $M_P$ of the deck fastening device will be defined as a plane defined by the y and z axes shown in FIG. 1. The "flange plane" $F_P$ will be defined as a plane defined by the z and x axes shown in FIG. 1. The "rear plane" $R_P$ will be defined as a plane defined by the y and x axes shown in FIG. 1.

The various aspects of the deck fastening device are now described with reference to the drawings.

FIG. 1 illustrates the deck fastening device 100 of the present subject application. In one aspect, the deck fastening device 100 includes a top portion 102 having a first flange 104 and a second flange 106 projecting from the longitudinal axis of the top portion 102. The flanges 104, 106 define a flange plane $F_P$. The deck fastening device 100 also includes an angled fastening receptor 108. When deck fastening device 100 is installed, the flanges 102, 104 fit into grooves formed or cut along longitudinal sides of deck boards. Alternatively, slots may be formed or cut into the longitudinal sides of the deck board to receive flanges 102, 104. The flanges 102, 104 of each deck fastening device 100, therefore, fit into adjacent deck boards. The boards and deck fastening device 100 are then held in place by installing a fastener, such as a screw, nail, bolt, or the like, through a through hole 109 in angled fastening receptor 108 of the deck fastening device 100, and into a joist below. In one particular example, a 2¼ inch, stainless steel screw may be used. In another specific example, a 1½ inch screw may be used. Such examples are not limiting, and any type of fastener may be employed. The through hole 109 defines an angled axis $A_A$ extending through a center of through hole 109.

Figure 2:
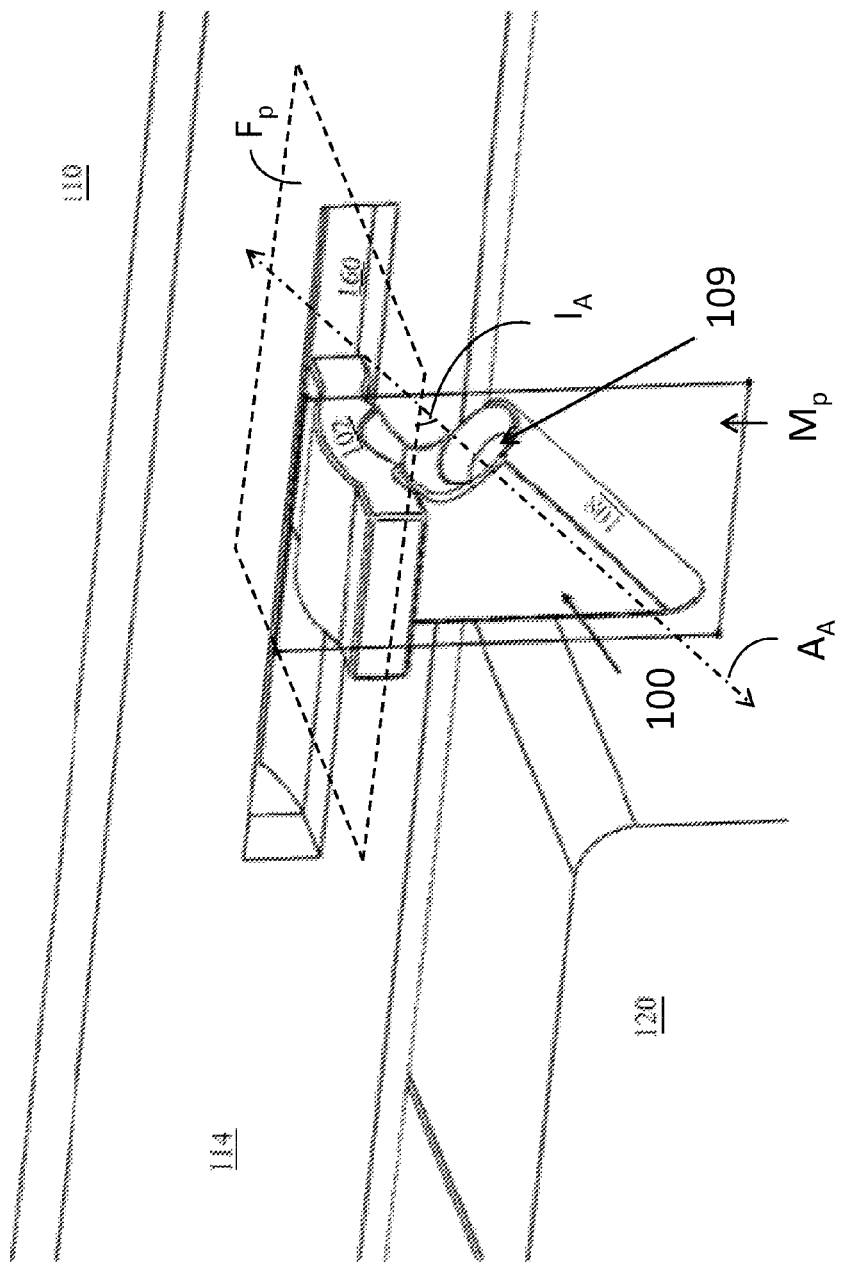
FIG. 2 depicts an example of an installation of the deck fastening device shown in FIG. 1. The deck fastening device is shown in relation to a deck board having a slot and a joist, in a configuration that could be used during an installation.

FIG. 2 illustrates a schematic diagram of an exemplary deck fastening device 100 and related arrangement in accordance with an aspect of the subject disclosure. In the construction of a deck or similar structure, the supporting substructure is generally fabricated from weather resistant materials, often pressure treated lumber, including vertical posts secured to the ground, spaced parallel joists 120 extending between the posts, headers spanning the posts and connecting the ends of the joists 120 to one another, and deck boards 110 fixed transversely to the top of the joists 120 to form a platform. While the substructure is more commonly comprised of wood, the deck boards 110 may be formed from wood, plastic, exotic hard woods, composite, or other material. Instead of grooves, deck board longitudinal sides 114 may alternatively include slots 160 to receive flanges 102, 104.

FIG. 2 further illustrates an intersecting angle $I_A$ between the angled axis $A_A$ and the flange plane $F_P$. The intersecting angle $I_A$ can vary between 0 and 90 degrees, depending on the angle of the angled fastening receptor 108.

Figure 3:
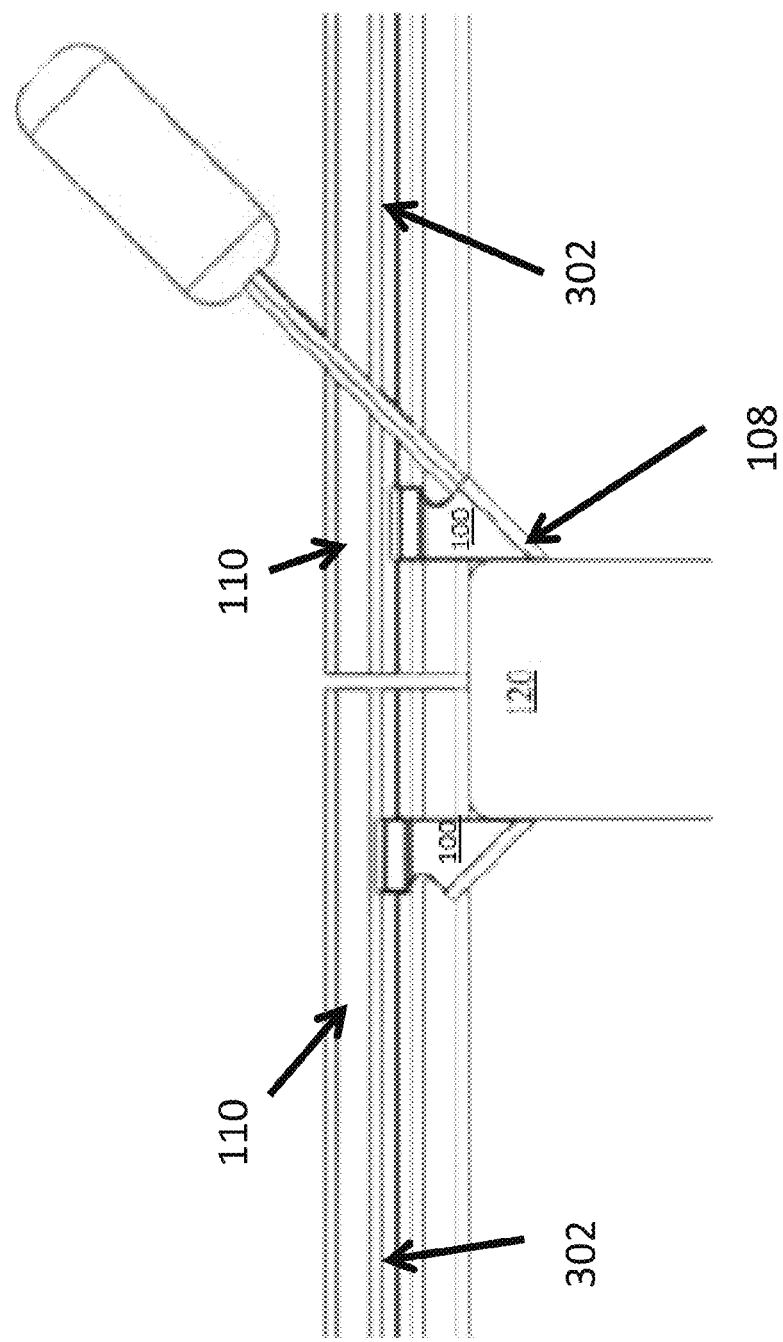
FIG. 3 depicts a side view of the deck fastening devices shown in FIG. 1, installed with respect to a joist and grooved deck boards.

FIG. 3 illustrates an installation of deck fastening devices 100. Initially, deck boards 110 are placed transversely across parallel joists 120. In accordance with one aspect of the subject disclosure, deck fastening devices 100 are inserted into the grooves 302 of the deck board. As the deck boards 110 are positioned, deck fastening devices 100 of the subject application are inserted into the grooves 302. In the case where an un-grooved deck is used, slots 160 (as shown in FIG. 2) can be formed or cut into the longitudinal sides 114 of the deck boards 110 at the point where a deck board 110 crosses an underlying joist 120. Slots 160 may be cut into the sides 114 of a deck board 110 using known woodworking tools such as a biscuit joiner or a router.

When the deck fastening device 100 is installed on the deck board 110 and joist 120, the angled fastening receptor 108 can receive a fastener, such that the angled fastening receptor is bisected by a meridian plane of the deck fastening device 100. Alternatively, angled receptor 108 can be designed to vary within a range of ±45 degrees with respect to the meridian plane. Accordingly, the deck fastening device 100 can enable access to the fastener itself (e.g., a screw or nail, etc.) from a top surface of the deck without requiring burdensome operations, such as removal of the deck board.

Furthermore, the angled fastening receptor 108 enables fastening a deck board 110 to a joist 120 without penetrating the deck board itself by the fastener (e.g., screw, nail, etc.). The through hole 109 may be threaded to receive a screw, or may have a non-threaded interior to receive a nail. Diameter of the through hole 109 can be varied to receive other types of fasteners.

If a slot 160 is used instead of a groove 302, the flanges 104, 106 may be shaped appropriately to form a secure fit. In order to fit within the semicircular profile of a slot 106 formed by a biscuit joiner or a router, the outer margins of the flanges 104 and 106 may be similarly curved. As another example, undersides of flanges 104 and 106 may include grooves 107 to securely fasten on a lip of a deck board 110.

The top portion 102 of deck fastening device 100 may employ a convex design to increase the weathering resistance of the deck fastening device 100. However, the top portion 102 can alternatively be flat, concave, or any other geometry with various curvature radiuses in order to fit into the grooves/slots of the deck boards. Alternatively, top portion 102 may include no curvature, and instead be formed of straight lines. Alternatively, top portion 102 may include both curvature radiuses and straight lines.

When in use, a first flange 104 of a deck fastening device 100 is inserted into a groove 302 (or slot 160) in the longitudinal side 114 of a deck board 110. A second deck board 110 is then brought alongside the first so that the second flange 106 is moved into the groove 302 (or slot 160) of the second deck board. FIG. 2 shows a deck fastening device 100 with an adjacent deck board positioned so that a flange 104 of the deck fastening device 100 are inserted into the slot 160 of the board 110. A fastener such as a nail or screw (not shown) is then installed through the through hole 109 of angled fastening receptor 108 and into an underlying support structure such as a joist 120. The deck fastening device 100 thereby secures the deck board 110 to underlying joist 120 via a downward force exerted by the top portion 102 onto the deck board 110. The fastener may be installed through the deck fastening device 100 such that the fastener is bisected by a meridian plane. Therefore, as the deck fastening device 100 is secured to the joist 120, the flanges 104 and 106 of the deck fastening device 100 likewise fasten the deck boards 110 to the joist 120.

The deck fastening device 100 may be formed of a resilient material such as plastic. The material chosen should be rigid enough so that the top portion 102 tends to resist flexion when a fastener is installed through the fastening receptor 108 into an underlying joist 120 or any other substructure. While the rigidity of the selected material should be sufficient to resist flexion of the top portion 102, it should not be brittle. Rather, the deck fastening device 100 should be able to withstand impacts from tools such as hammers, as well as movement of the deck boards 110 themselves. For example, the fabrication materials can include a wide variety of materials including plastics, metals, glasses, elastomers, composites etc. Examples of such materials includes but is not limited to ABS, Liquid Silicone Rubber, PES, SAN, PSU, Aluminum, Stainless Steel, etc.

Moreover, in a related aspect the top portion 102 can be separated from the fastening receptor 108 via a section of pliable material having a high elasticity and/or high molecular weight. Example materials include thermoplastics, such as polyvinyl alcohols, polycarbonates, plasticized acrylonitrile butadiene styrene, plasticized polyvinyl chloride, silicon polymers or thermosets such as cast elastomers and polyurethane. Such pliable materials enable rotation of the fastening receptor 108 with respect to top portion 102. A rotatable fastening receptor 108 can further facilitate the installation operation, because the fastening receptor 108 can be moved to avoid defects, cracks, holes, or the like located in the joist 120.

The angled fastening receptor 108 enables accessibility to the fastener itself from a top surface of the deck. The fastener is accessible without requiring burdensome operations, such as removal of the deck board or accessing the deck from below. The angled design further improves the longevity of the resulting deck by repositioning the point of penetration to the side of the fastener, which is less prone to weathering.

FIG. 3 further demonstrates that deck fastening devices 100 can be used on both sides of the joist 120 to secure each decking board individually as illustrated. As further seen in FIG. 3, the deck fastening devices 100 may be located below a top surface of deck boards 110 when installed, thereby hiding the deck fastening devices 100 from view. Despite being hidden from view, the fasteners may still be accessible from above the deck, as shown in FIG. 3.

The design of deck fastening device 100 permits its use with all types and brands of grooved boards. Because deck fastening device 100 may be installed into a side of substructure or joist 120, it can accommodate any distance between the deck board grooves 302 and a bottom surface of deck board 110. In other words, the same sized deck fastening device 100 may be used on any grooved board, because the deck fastening device may be installed higher or lower with respect to the substructure or joist 120 without affecting functionality.

A description of an exemplary installation will now be set forth. This description is an example only, and is not intended to limit the ways in which deck fastening device 100 may be used. The deck boards 110 may be laid out perpendicular to the substructure or joists 120 of the deck. A first deck board 110 may be attached to the substructure or joists 120 using face screws to provide a solid start for the remainder of the deck boards 110. A first flange 104 of the deck fastening device 110 may then be inserted into a groove 302 of the first deck board 110 and the screw may then be screwed through the through hole 109 and partially into the substructure or joist 120 below. This process may be repeated for all of the substructure or joists 120 along the length of the deck board 110. The groove 302 of the next deck board may then be pushed onto the other flange 106 of the deck fastening device 100. The above process may then be repeated for the other side of the deck board 110 that was just put into place. Once this is completed, the first set of screws can be fully installed. The entire process is then repeated until the deck is completed.

Figure 4:
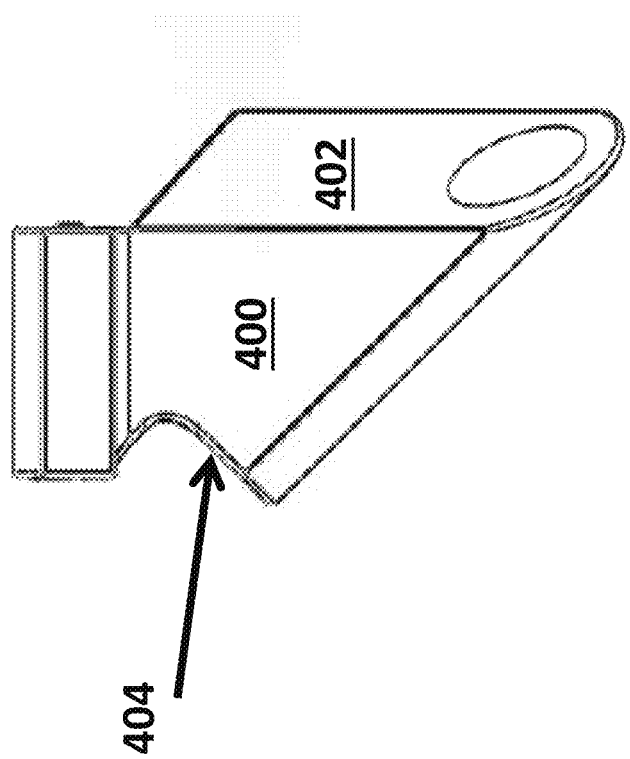
FIG. 4 depicts a side view of a second embodiment of deck fastening device, having a slanted rear surface.

FIG. 4 demonstrates an alternative embodiment of the deck fastening device. The deck fastening device 400 may include an additional slanted structure 402 on the back of the deck fastening device 400 in case an angled installation of decking is desired. Slanted structure 402 can be made integral with deck fastening device 400, or can be added to deck fastening device 400 via any known means. Slanted surface 402 allows deck fastening device 400 to be mounted in irregular substructures, to alter the angle of angled through hole 404 relative to a joist. In other embodiments, other types of structures can be added to the deck fastening device 400 to allow a conforming fit with irregular installation surfaces. Alternatively, deck fastening device 400 can be formed in irregular shapes. Those of skill in the art will appreciate that the general shape of the deck fastening device 400 can be altered for adaption to all substructure shapes without departing from the scope of the present disclosure. For example, in one embodiment, the flanges of the top portion may be disposed at an acute angle with respect to the receptor portion of the device. Alternatively, the flanges may be in different planes.

Figure 5:
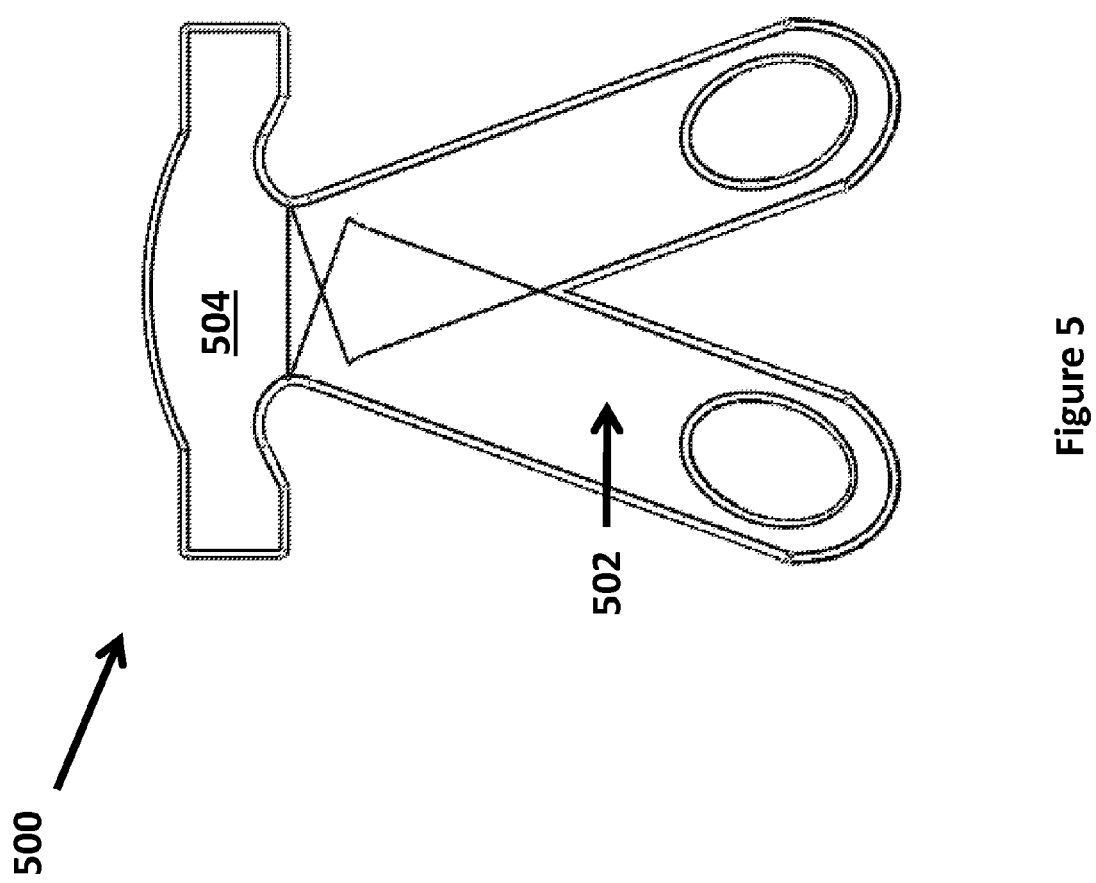
FIG. 5 depicts a third embodiment of deck fastening device, with a fastening receptor angled with respect to a top portion of deck fastening device.

FIG. 5 illustrates an alternative embodiment of deck fastening device 500. In this embodiment, angled fastening receptor 502 is affixed to top portion 504 via a pliable material of high molecular weight and/or high elasticity. Example materials include thermoplastics, such as polyvinyl alcohols, polycarbonates, plasticized acrylonitrile butadiene styrene, plasticized polyvinyl chloride, silicon polymers or thermosets such as cast elastomers and polyurethane. This allows play between angled fastening receptor 502 and top portion 504, and allows the deck fastening device 500 to be mounted in different, irregular or unsymmetrical configurations. Alternatively, angled fastening receptor 502 could be immovably fixed to top portion 502 to form an angle with a meridian plane of the deck fastening device 500. In one embodiment, the angled fastening receptor 502 can be located ±45 degrees with respect to a meridian plane $M_P$ of the deck fastening device 500.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard engineering techniques to produce software, circuits to implement the disclosed innovation.

What has been described above includes various exemplary aspects. It is, of course, not possible to describe every conceivable combination of components or methodologies for purposes of describing these aspects, but one of ordinary skill in the art may recognize that many further variations and permutations are possible. Accordingly, the aspects described herein are intended to embrace all such alterations, modifications and variations that fall within the spirit and scope of the appended claims.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

It is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A fastening device, comprising:
   a receptor portion having an angled through hole extending from a first surface of the receptor portion to a second surface of the receptor portion,
      wherein the angled through hole defines a first opening and a second opening in the first surface and the second surface, respectively,
      wherein the angled through hole defines an angled axis,
      wherein the first opening in the first surface of the receptor portion is configured to receive a fastener,
      wherein the second surface of the receptor portion is configured to abut a joist;
   a top portion having at least two flanges, including a first flange and a second flange, extending outwardly from the receptor portion,
   wherein the flanges define a flange plane;
   wherein the first opening in the first surface of the receptor portion is distal from the first flange, second flange and top portion;
   wherein the top portion extends above the receptor portion and has a convex upper surface extending in an arc along a side-side axis from the first flange to the second flange;
   wherein the first opening in the first surface is a first distance from the flange plane, and the second opening in the second surface is a second distance from the flange plane, such that the first distance is less than the second distance;
   wherein the angled axis intersects the flange plane at an intersecting angle between 19 and 71 degrees; and
   wherein at least one flange has a groove on a bottom surface of the flange extending from a front of the top portion to a back of the top portion.

2. The fastening device of claim 1, wherein the first flange extends outwardly from a first side of the convex upper surface of the top portion along the side-side axis, and the second flange extends outwardly from a second side of the convex upper surface of the top portion opposite the first side along the side-side axis.

3. The fastening device of claim 1, wherein the intersecting angle is between 39 and 51 degrees with respect to the flange plane.

4. The fastening device of claim 1, wherein the second surface of the receptor portion defines a rear plane.

5. The fastening device of claim 4, wherein the rear plane is perpendicular to the flange plane, and wherein the rear plane is perpendicular to a meridian plane, the meridian plane defined by a top-bottom axis and a front-back axis of the fastening device.

6. The fastening device of claim 1, further comprising a meridian plane defined by a front-back axis and a top-bottom axis of the fastening device, wherein the receptor portion forms an angle in the range of ±45 degrees with the meridian plane.

* * * * *